United States Patent
Bechtel et al.

(10) Patent No.: US 9,477,456 B2
(45) Date of Patent: Oct. 25, 2016

(54) METHOD FOR INSTALLING AND SIMULTANEOUSLY UPDATING OPERATING SYSTEM SOFTWARE

(75) Inventors: Andreas Bechtel, Heidelberg (DE); Erik Leidel, Heidelberg (DE); Mario Rottloff, Neckargemuend-Dilsberg (DE); Bernd Sommerlade, Mannheim (DE); Wilhelm Thome, St. Leon-Rot (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 864 days.

(21) Appl. No.: 13/480,102

(22) Filed: May 24, 2012

(65) Prior Publication Data
US 2012/0304165 A1 Nov. 29, 2012

(30) Foreign Application Priority Data

May 24, 2011 (DE) .................. 10 2011 102 425

(51) Int. Cl.
*G06F 9/445* (2006.01)
*G06F 9/44* (2006.01)
(Continued)

(52) U.S. Cl.
CPC . *G06F 8/61* (2013.01); *G06F 8/60* (2013.01); *G06F 3/1225* (2013.01); *G06F 8/65* (2013.01); *G06F 8/71* (2013.01); *G06F 9/4406* (2013.01); *G06F 21/606* (2013.01)

(58) Field of Classification Search
CPC .............. G06F 8/65; G06F 8/61; G06F 8/60; G06F 8/71; G06F 9/4406; G06F 3/1225; G06F 21/606
See application file for complete search history.

(56) References Cited

U.S. PATENT DOCUMENTS 5,892,952 A * 4/1999 Seko .................. G06F 8/60
717/174
6,070,012 A 5/2000 Eitner et al.
(Continued)

FOREIGN PATENT DOCUMENTS

EP 0 959 405 A2 11/1999
JP H10133860 A 5/1998
(Continued)

OTHER PUBLICATIONS

Ramesh Jha, What is Swapping in Operating System, Oct. 8, 2010, retrieved online on Jun. 13, 2016, pp. 1-3. Retrieved from the Internet: <URL: http://blog.sudobits.com/2010/08/10/what-is-swapping-in-operating-system/>.*
(Continued)

*Primary Examiner* — Thuy Dao
*Assistant Examiner* — Hanh T Bui
(74) *Attorney, Agent, or Firm* — Laurence A. Greenberg; Werner H. Stemer; Ralph E. Locher

(57) ABSTRACT

A method for installing operating system software on a machine computer for controlling machines includes transmitting further operating system software, in addition to old operating system software already running on the machine computer, while the machine is operating. The method also includes installing the further operating system software on the machine computer while the machine is operating, transferring user data from the old operating system software to the further operating system software while the machine is operating, and switching off the machine computer and choosing between starting the old operating system software and starting the newly installed further operating system software when switching on the machine again.

9 Claims, 7 Drawing Sheets

(51) Int. Cl.
*G06F 21/60* (2013.01)
*G06F 3/12* (2006.01)

(56) References Cited

U.S. PATENT DOCUMENTS

| | | | |
|---|---|---|---|
| 6,850,973 | B1 | 2/2005 | Larson et al. |
| 7,287,473 | B2 | 10/2007 | Kleibaumhueter et al. |
| 7,328,347 | B2 | 2/2008 | Keim et al. |
| 7,543,168 | B1* | 6/2009 | Thompson ............. G06F 9/441 713/1 |
| 7,580,992 | B2 | 8/2009 | Eisenbeis et al. |
| 8,108,853 | B2* | 1/2012 | Bale ..................... G06F 8/60 717/168 |
| 8,924,952 | B1* | 12/2014 | Hou ..................... G06F 8/665 710/1 |
| 2003/0070162 | A1* | 4/2003 | Oshima et al. ............. 717/171 |
| 2003/0084206 | A1* | 5/2003 | Floman ................. G06F 9/445 710/1 |
| 2003/0182411 | A1* | 9/2003 | Wang ..................... G06F 8/65 709/223 |
| 2004/0206261 | A1 | 10/2004 | Hiraoka |
| 2005/0097194 | A1 | 5/2005 | Eisenbeis et al. |
| 2006/0232816 | A1 | 10/2006 | Konno |
| 2007/0144379 | A1 | 6/2007 | Yamamoto et al. |
| 2007/0180206 | A1* | 8/2007 | Craft ................. G06F 11/1433 711/162 |
| 2009/0138865 | A1* | 5/2009 | Furbee ................... G06F 8/67 717/168 |
| 2010/0018416 | A1 | 1/2010 | Senoo |
| 2010/0106885 | A1* | 4/2010 | Gao ................... G06F 9/45537 711/6 |
| 2010/0131746 | A1 | 5/2010 | Cool et al. |
| 2011/0072505 | A1* | 3/2011 | Ott ....................... G06F 8/61 726/11 |
| 2012/0304165 | A1* | 11/2012 | Bechtel ................. G06F 8/61 717/174 |

FOREIGN PATENT DOCUMENTS

| | | |
|---|---|---|
| JP | 2004314530 A | 11/2004 |
| JP | 2004318871 A | 11/2004 |
| JP | 2005242512 A | 9/2005 |
| JP | 2006218722 A | 8/2006 |
| JP | 2006293882 A | 10/2006 |
| JP | 2007175927 A | 7/2007 |
| JP | 2009211537 A | 9/2009 |
| JP | 2009288929 A | 12/2009 |
| WO | 2008035780 A1 | 3/2008 |

OTHER PUBLICATIONS

John L. Donaldson, Implementation of Threads as an Operating Sytems Project, ACM, 2008, retrieved online on Jun. 13, 2016, pp. 187-191. Retrieved from the Internet<URL: http://delivery.acm.org/10.1145/1360000/1352200/p187-donaldson.pdf?>.*

Rick Broida: "Take Ubuntu for a non-invasive test drive with Wubi", May 9, 2007, XP002680787, URL:http://lifehacker.om/258936/take-ubuntu-for-a-non+invasive-test-drive-with-wubi?tag=softwarefeaturedwindowsdownload.

German Patent and Trademark Office Search Report, Dated December 9, 2011.

"Understanding a method for obtaining Windows XP and for the correct implementation of the software", Nikkei Win PC, Nikkei Business Publications, Inc., Sep. 29, 2010, vol. 16, edition 16, pp. 56-59—English translation.

"Introduction to Windows Server Update Services (WSUS)", Tetsuya Yokoyama, Network magazine, ASCII Media Works Inc., Jan. 5, 2009, vol. 14, edition 5, pp. 120-127—English translation.

* cited by examiner

METHOD FOR INSTALLING AND SIMULTANEOUSLY UPDATING OPERATING SYSTEM SOFTWARE

CROSS-REFERENCE TO RELATED APPLICATION

This application claims the priority, under 35 U.S.C. §119, of German Patent Application DE 10 2011 102 425.9, filed May 24, 2011; the prior application is herewith incorporated by reference in its entirety.

BACKGROUND OF THE INVENTION

Field of the Invention

The present invention relates to a method including a plurality of method steps for installing operating system software on a machine computer to control machines.

Modern control computers for machines, for example printing machines, have an operating system which, like the operating systems of conventional PCs such as Windows, MacOS or Linux, can be replaced with more up-to-date software versions. The more up-to-date software versions are needed to update the operating system and open up new possibilities for the user of the machine. In the case of a PC, replacing the operating system software does not cause any major problems insofar as it is possible, without any problems, to shut down the PC, to install the new operating system and to activate the PC again. However, that procedure takes some time, which would result in the standstill of the machine in the case of a machine computer. However, a standstill of the machine is associated with high costs for the operator since he or she cannot use the machine during that time. Therefore, it is not acceptable for the operator of a machine to stop the control computer for the machine and to be unable to use the machine while replacing or updating the operating system software. Furthermore, when updating or replacing an operating system, there is always the risk of the software replacement failing and the old reliable state of the control computer then only being able to be established in a painstaking manner or possibly no longer being possible at all due to data losses. The procedure known from operating system updating in PCs is therefore virtually unsuitable for updating the operating system of a machine computer, even if it is the same operating system software as in PCs.

U.S. Patent Application Publication No. US 2010/0131746 A1 discloses the practice of installing a plurality of operating systems in different partitions on a computer. When switching on the computer, it is then possible to use a so-called boot manager to select the desired operating system in order to ensure that the correct files needed for the selected operating system are used. That system makes it possible to use different operating systems in a parallel manner on different partitions but does not solve the problem of the computer being switched off when replacing an operating system and not being available when replacing or changing the operating system.

U.S. Pat. No. 7,328,347 B2 discloses safe remote control for remote maintenance. U.S. Pat. No. 7,287,473 B2 is used to detect operating states in printing machines, which states can then be evaluated for the purpose of remote maintenance.

SUMMARY OF THE INVENTION

It is accordingly an object of the invention to provide a method for installing and replacing, changing or updating operating system software on a machine computer, which overcomes the hereinafore-mentioned disadvantages of the heretofore-known methods of this general type and which results in the shortest possible standstill time of the machine computer and thus of the machine.

With the foregoing and other objects in view there is provided, in accordance with the invention, a method for installing operating system software on a machine computer for controlling a machine. The method comprises transmitting further operating system software, in addition to old operating system software already running on the machine computer, while the machine is operating, installing the further operating system software on the machine computer while the machine is operating, transferring user data from the old operating system software to the further operating system software while the machine is operating, and switching off the machine computer and choosing between starting the old operating system software and starting the newly installed further operating system software when switching on the machine again.

The method according to the invention for installing operating system software is suitable, in principle, for all control computers of machines or for normal PCs. The control computers (also called machine computers) are usually so-called IPCs (industrial computers) which operate with a known operating system such as Windows or Linux. In order to minimize the standstill time of the machine computer when replacing or updating the operating system software, the following method steps are provided. First of all, further operating system software, in addition to the operating system software already running on the machine computer, can be transmitted while the machine computer is running and the machine is running. The further operating system software is likewise already installed on the machine computer when the machine computer and machine are still running. After the further operating system software has been installed, the user data from the running operating system software are copied to the further operating system software while the machine and the machine computer are still operating. The operation of the machine and of the machine computer must be interrupted only in order to start the further operating system software by switching off the machine computer and by the operator then being able to choose between starting the old operating system software and starting the newly installed further operating system software when switching on the machine again. This has the great advantage that the standstill of the machine computer and thus of the associated machine is reduced to the period of time needed to restart the machine computer. However, this is a period of time which is several times shorter than that needed to transmit and install new operating system software. In this case, the further operating system software may be an up-to-date version of the already running operating system software, a so-called software update. However, it may also be a new operating system from the same software manufacturer or from a different software manufacturer. The method according to the invention is thus extremely flexible to use and is suitable for all changes to the operating system software on a machine computer.

In accordance with another mode of the invention, the further operating system software can be installed on the same storage medium as the already running operating system software. This means that the old operating system and the new operating system can be installed, for example, on the same hard disk of the machine computer. Therefore, there is no need for two independent hard disks or storage media to be present. Only different partitions for the operating system software are created on the same storage medium. In this case, a separate partition is created for each item of operating system software during transmission. All partitions may be on the same hard disk.

In accordance with a further mode of the invention, the possible selection when switching on the machine again can include more than two operating system software versions. This has the great advantage that it is not only possible to select the further operating system software, which has just been installed, and the currently running operating system software, but rather the machine operator can select all operating system software versions which are present on the storage medium of the machine computer and have not been deleted, with the result that the number and possible selection of operating system software versions are restricted only by the size of the storage space of the machine computer.

In accordance with an added mode of the invention, the further operating system software can be transmitted to the machine computer from a remote maintenance computer over an Internet connection. Due to the different number of versions of machines, the operating system software on the machine computer must frequently be adapted to the respective machine. In order to ensure that every machine computer receives the correct software version adapted to the machine, a further operating system should be transmitted by expert staff. In order to avoid use of the staff in situ or at the machine, the further version of the operating system can be transmitted to the machine computer by a management computer belonging to the machine manufacturer over the Internet and can be installed on the machine computer. This management computer may be simultaneously a remote maintenance computer which is usually used to carry out remote maintenance operations on the machine computers. In this manner, no service staff is required in situ or at the machine and the correct software version can be installed on the machine computer by the manufacturer itself over the Internet. Alternatively, it is naturally also possible to store the appropriate operating system software on a mobile data storage medium such as a USB stick or a recordable DVD and to send this mobile data storage medium to the machine operator or, with higher costs, to have it installed on the machine in situ or at the machine by service staff associated with the manufacturer. For this purpose, the machine computer has a corresponding interface or a drive through which the software can be transmitted using the USB stick or the DVD.

In accordance with an additional mode of the invention, before the further operating system software is installed, provision is advantageously also made for the machine computer and/or the remote maintenance computer to check whether or not the further operating system software is suitable for installation on the machine computer. This check is used to avoid installing operating system software which is unsuitable for the machine computer or is incomplete. This is important since unsuitable operating system software may result in malfunctions and, in particular, in the machine computer crashing, which may prevent activation of the machine or may even result in damage to the machine when the machine is operated using unsuitable operating system software. In this case, the checking operation can be carried out either on the remote maintenance computer before sending the software to the machine computer or on the machine computer itself. It is also possible to incorporate double safety and to carry out the checking operation both on the machine computer and on the remote maintenance computer. During this check, the computer compares the requirements of the machine computer with the operating system software provided and, if necessary, carries out diagnostic tests on the machine computer in order to determine the properties of the machine computer and to find out the current configuration. This is particularly important if the machine was supplemented with new models and was changed over the course of operation, which frequently occurs with printing machines. These changes are often not known to the manufacturer and are then not taken into account when providing the operating system software. However, when checking the machine computer, such changes are detected and are reported back to the remote maintenance computer, with the result that the operating system software is adapted to the change, if necessary, before it is transmitted to the machine computer for installation.

In accordance with again another mode of the invention, provision is also made for the installation of the further operating system software to be signaled to an operator of the machine on a display apparatus. While the machine is running, the operator is thus informed that up-to-date operating system software is available for installation. The operator can then agree to the installation by acknowledgement with a mouse or can decline the installation or postpone it to a later time.

In accordance with again a further mode of the invention, it is also advantageous that the machine computer selects required software modules of the further operating system software on the basis of the properties of the machine computer and of the machine and installs those modules in the correct order. In this case, the remote maintenance computer provides the machine computer with more software modules than necessary and the machine computer automatically selects the required software modules on the basis of the configuration of the machine and of the machine computer and then installs them in the correct order. In the event of incorrect transmissions or missing software modules, the machine computer may likewise request these modules from the remote maintenance computer in order to complete the installation process.

In accordance with again an added mode of the invention, in the event of the further operating system software failing to start, one particularly advantageous refinement of the invention provides for the machine computer to automatically carry out a restart with older operating system software. This ensures that the machine is changed, in any case, to a state ready for operation again, even if there is an error in the further operating system software and the further operating system software has failed to start. In this case, the operator need not take any further measures in order to be able to change his or her machine to an operational state again.

In accordance with a concomitant mode of the invention, provision is also made for desired operating system software to be able to be selected by an operator of the machine through a display apparatus, and for selected operating system software to then be installed by the machine computer. In this case, before installation, the machine operator is provided with a plurality of versions or different operating systems for selection and the operator can select the operating system or software update acceptable to him or her, with the result that it is installed. It is also possible for the operator to select a plurality of versions or types of the operating system software and then for a plurality of new operating system software versions to be simultaneously installed in a plurality of partitions. The operator himself or herself can thus decide which and how many operating system software versions he or she would like to have installed on his or her machine computer.

Other features which are considered as characteristic for the invention are set forth in the appended claims.

Although the invention is illustrated and described herein as embodied in a method for installing and simultaneously updating operating system software, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
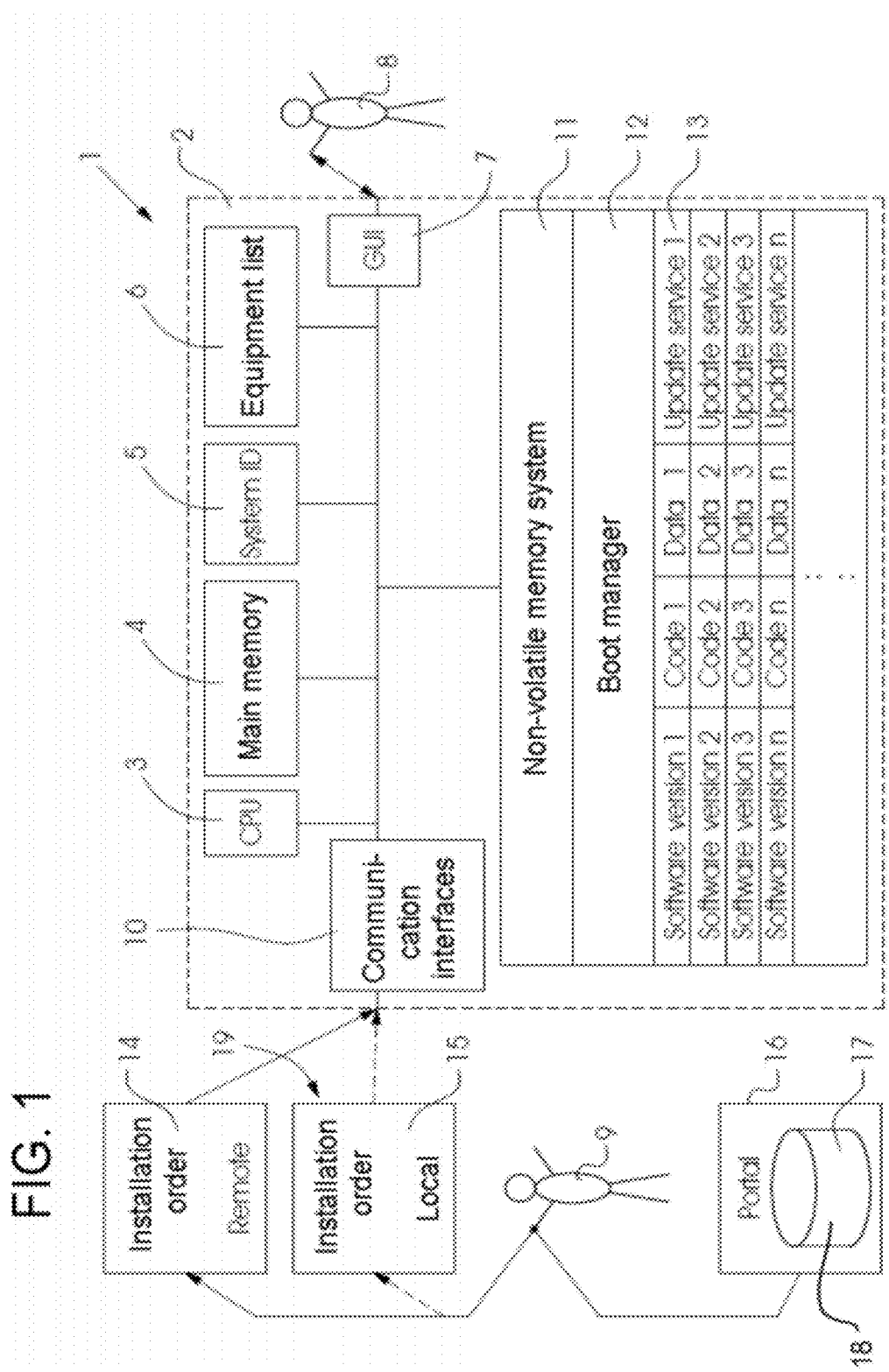
FIG. 1 is a block diagram showing an overview of components involved in installing further operating system software.

Referring now to the figures of the drawings in detail and first, particularly, to FIG. 1 thereof, there is seen an overview of components involved in installing further operating system software 18. The further operating system software 18 is provided on a remote maintenance computer 17 by a service employee 9 associated with the manufacturer. This remote maintenance computer 17 is connected to the Internet over an Internet service portal 16. In this manner, the service employee 9 can transmit the further operating system software 18 from his or her remote maintenance computer 17 to a control computer 2 of a printing machine 1 over the Internet and a corresponding network connection 10. The printing machine 1 with the control computer 2 is controlled in situ by a machine operator 8. The provision of new operating system software 18 is displayed to the machine operator 8 on a screen through a graphical user interface (GUI) 7. The operator 8 can then confirm or decline the installation of the software 18. If the operator 8 accepts installation, the remote maintenance computer 17 automatically creates a remote installation order 14 and sends the software components needed for the further operating system software 18 to the control computer 2 over the Internet on the basis of the requirements of the control computer 2 and of the printing machine 1. Alternatively, it is also possible to transfer the further operating system software 18 to a data storage medium 19 such as a USB stick or a DVD and to then send the data storage medium to the operator 8 who in turn connects the USB stick 19 to the control computer 2 or inserts the DVD and starts the installation process. In this case, the control computer 2 will, in most cases, be an industrial PC which has a microprocessor (CPU) 3, a main memory 4 and a hard disk 11. The control computer 2 also has a system ID 5 which makes it possible to uniquely identify the control computer 2. The hard disk 11 also stores an equipment list 6 which includes the current configuration of the control computer 2 and of the printing machine 1, with the result that the current configuration of the control computer 2 and of the printing machine 1 can always be taken into account during installation. The control computer 2 can communicate with the operator 8 through a screen and the graphical user interface (GUI) 7. The hard disk drive 11 also contains a boot manager 12 which makes it possible to select different variants, types or versions of operating system software 13 when shutting down or restarting the control computer 2. There is a separate partition for each item of operating system software 13 on the hard disk drive 11, with the result that a new partition is respectively added when installing the further operating system software 18. In this case, the entire process of installing the further operating system software 18 takes place during normal operation of the control computer 2 and of the printing machine 1, with the result that there is no need for a standstill during the installation process.

Figure 2:
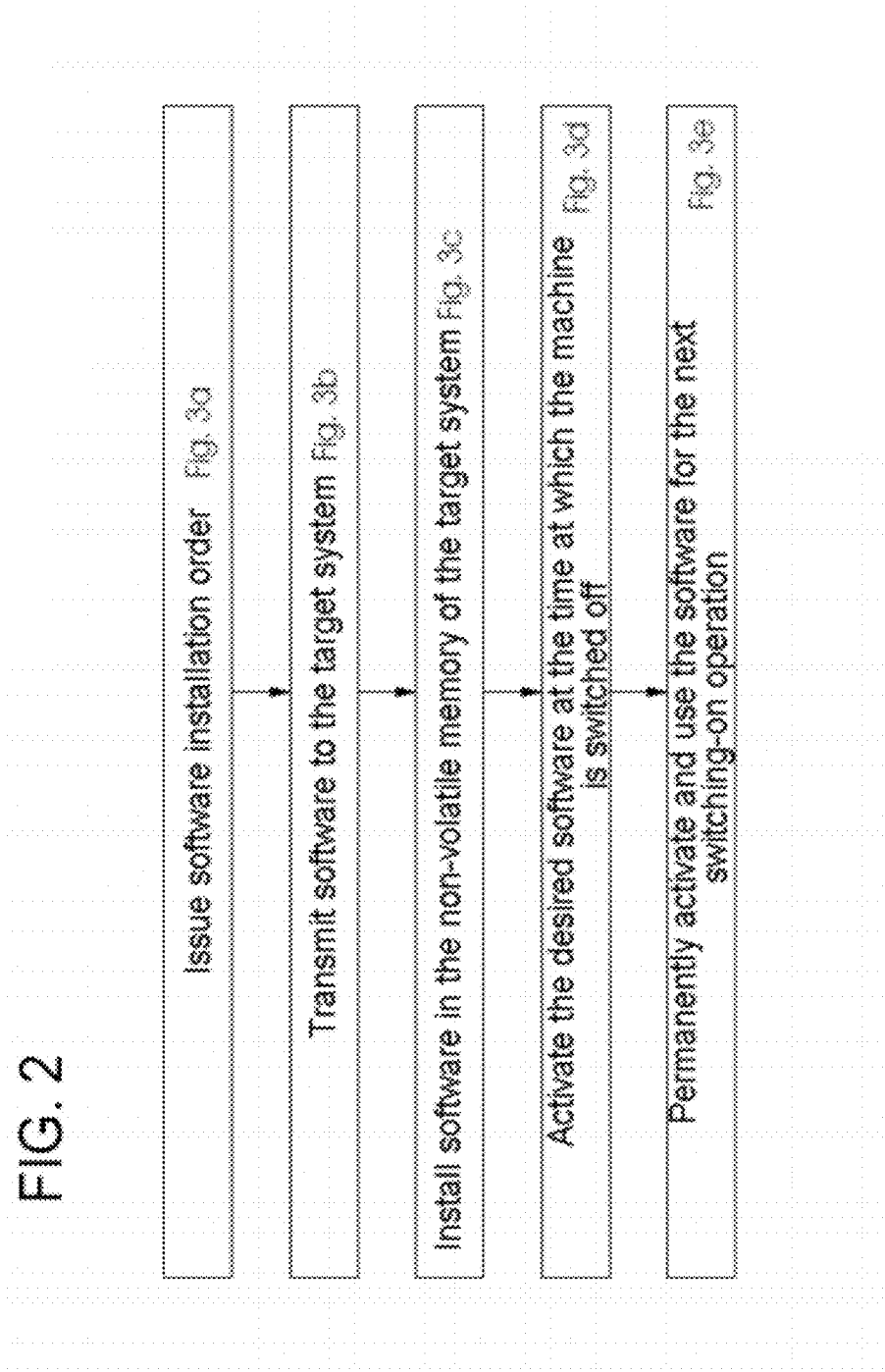
FIG. 2 is a flow chart showing an overview of method steps when installing further operating system software.

FIG. 2 reveals important steps for installing the further operating system software 18 in parallel with the previous software 13. First of all, a software installation order 14 is issued and the new operating system 18 is transmitted to the control computer 2. The new operating system software 18 is then installed in a new partition of the hard disk memory 11 on the control computer 2. When shutting down the control computer 2, the operator can choose between the previous operating system software 13 and the new operating system 18 for the restart. If the operator selects the new operating system software 18, it is automatically activated the next time the control computer 2 is booted up and is used as standard in future switching-on operations. Alternatively, it is also possible to select and activate the desired software only when restarting the machine computer 2.

Figure 3A:
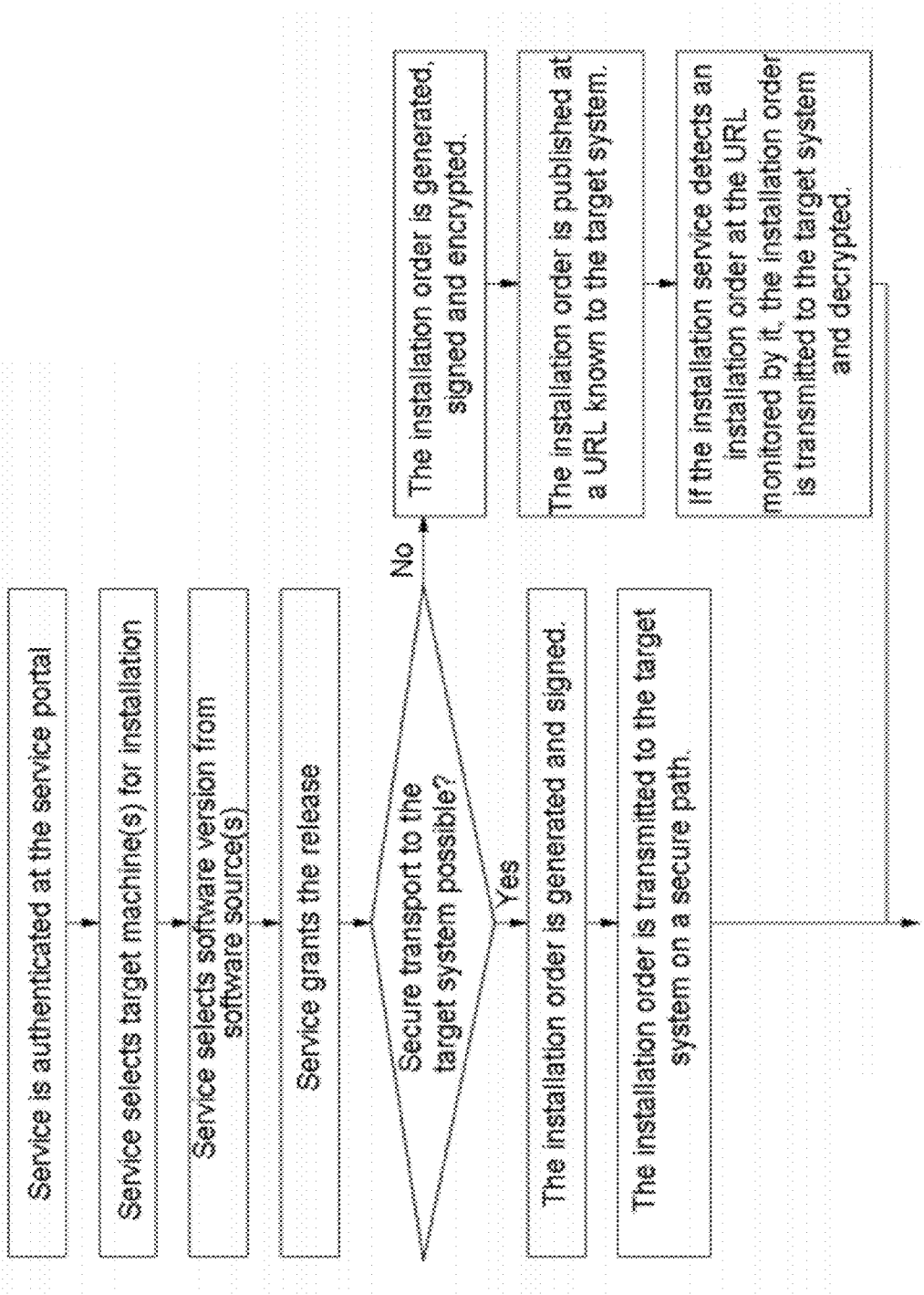
FIG. 3A is a flow chart showing initialization of an installation order for a further operating system.

FIG. 3A shows the manner in which a software installation order 14 is issued. A service employee 9 logs onto the remote maintenance computer 17 at the manufacturer of the printing machine 1 or the manufacturer of the further operating system software 18. The service employee 9 then selects all printing machines 1 on which the new operating system software 18 is intended to be installed. The software packages of the further operating system software 18 can then be sent through the service portal 16 and the Internet connection 10. Before distributing the new operating system software 18, the service employee 9 selects the appropriate operating system software 18 on the remote maintenance computer 17 and grants the release after checking whether the further operating system software 18 is suitable for the respective printing machine 1 and the associated control computer 2. If secure transport to the control computer 2 is possible, an installation order 14 is generated and signed and is then sent to the control computer 2 on the secure path. If the Internet connection is not secure, the installation order 14 is first of all signed and encrypted and is then published on the Internet at an Internet address (URL) known to the control computer 2. As soon as the installation service on the control computer 2 detects an installation order 14 at the Internet address (URL) known to it, this installation order 14 is transmitted to the control computer 2 and is decrypted.

Figure 3B:
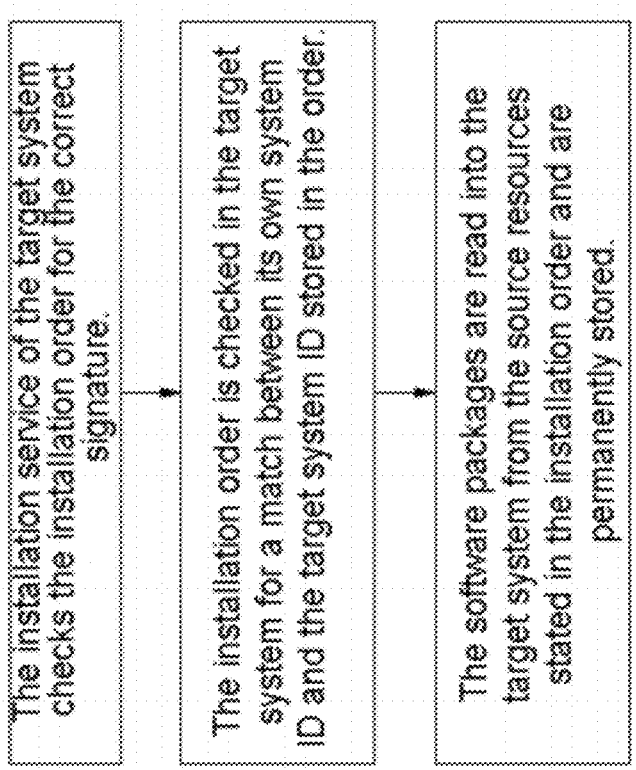
FIG. 3B is a flow chart showing checking of an installation order for a further operating system.

As soon as the installation order 14 has been transmitted to the control computer 2, the installation service of the control computer 2 checks whether or not the signature is correct. Further checks in FIG. 3B are initiated only if the signature is correct. In this case, the installation service then checks whether or not the ID of the installation order matches the system ID 5 of the control computer 2. Installation is continued only if that ID matches. In this case, the software packages of the further operating system software 18 are downloaded to the control computer 2 from the sources stated in the installation order 14 over the Internet and are stored on the hard disk drive 11 of the control computer.

Figure 3C:
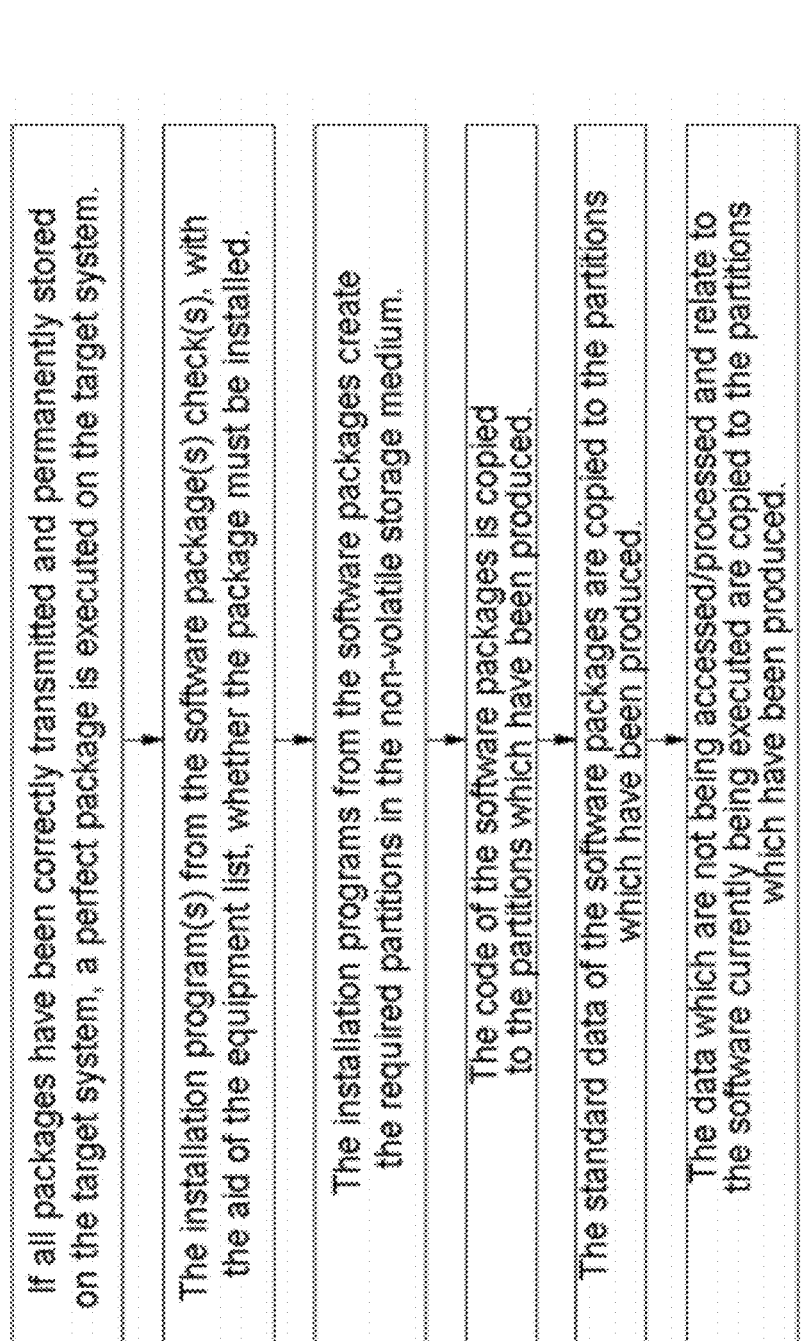
FIG. 3C is a flow chart showing transmission of the operating system software required for installation to a machine computer.

After all of the software packages of the new operating system software 18 have been correctly transmitted and permanently stored on the hard disk drive 11 of the control computer 2, a software package which is accordingly denoted as a starting package is executed in a new partition on the hard disk 11. During installation, a check is carried out in order to determine which of the software packages of the operating system software 18 is actually required. For this purpose, the control computer 2 compares the equipment list 6 with the software packages being offered. In this case, only those software packages which are also required on the basis of the stored equipment list 6 are installed. As is shown in FIG. 3C, a corresponding partition is created on the hard disk drive 11 for each item of further operating system software 18. The corresponding software packages of the further operating system software 18 are then copied to the partitions which have been produced. After the software packages have been installed, the data which are currently not being accessed and relate to the operating system 13 currently being executed are copied. The data currently being used are subsequently added in a further step.

Figure 3D:
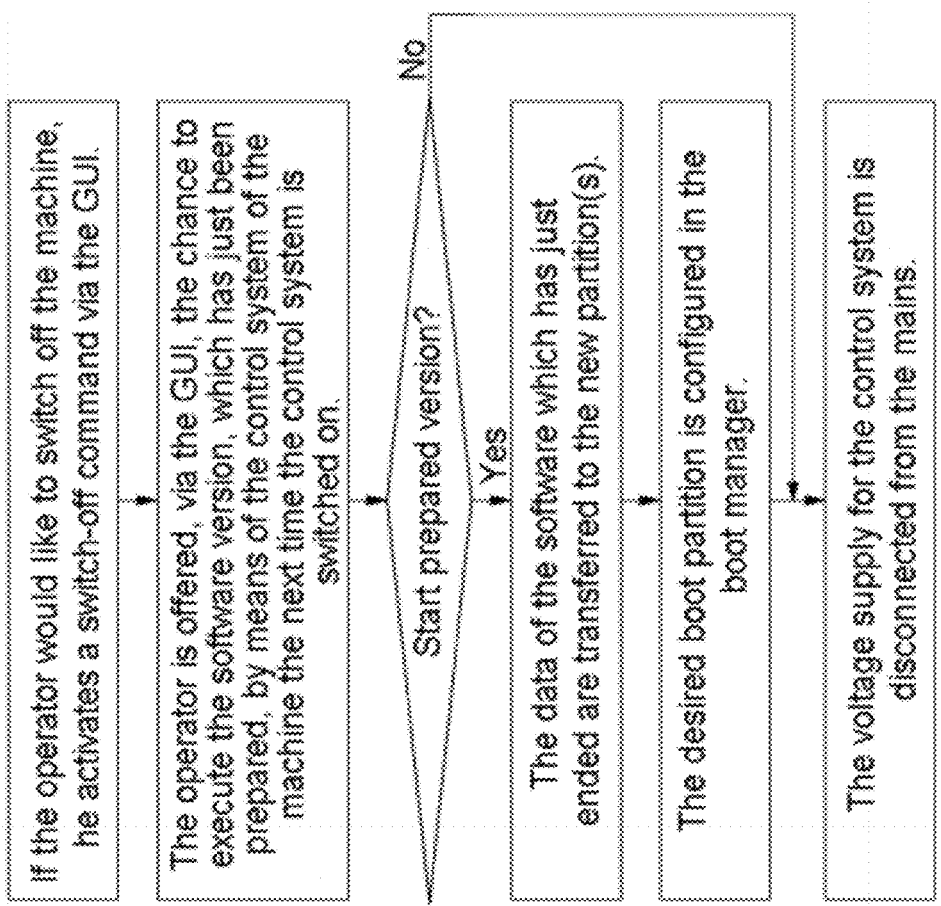
FIG. 3D is a flow chart showing activation of the further operating system software on the machine computer.

FIG. 3D shows the operation of changing over from the old operating system software 13 to the new operating system 18. In order to switch off the printing machine 1 and the control computer 2, the operator 8 uses a mouse to activate a corresponding field, which activates a switch-off command, in the graphical user interface 7. During the switching-off operation, the graphical user interface 7 provides the operator 8 with the option of choosing between different operating system software versions 13, 18. In this case, the operator 8 can stipulate that the new operating system software 18 be executed instead of the previous operating system 13 the next time the control computer 2 is switched on. If the operator 8 selects the previous operating system 13, the control computer 2 is shut down in a very normal manner and the voltage supply for the control computer is disconnected from the mains. However, if the operator 8 selects the new operating system software 18, the data which were previously still being accessed by the previously used operating system software 13 are first of all transferred to the new partition of the new operating system software 18. The boot partition of the new operating system software 18 is then accordingly configured in the boot manager 12, with the result that the new operating system 18 is started instead of the previous operating system 13 during the next restart. The power supply for the control computer 2 is then also interrupted in this case and the control computer 2 is switched off.

Figure 3E:
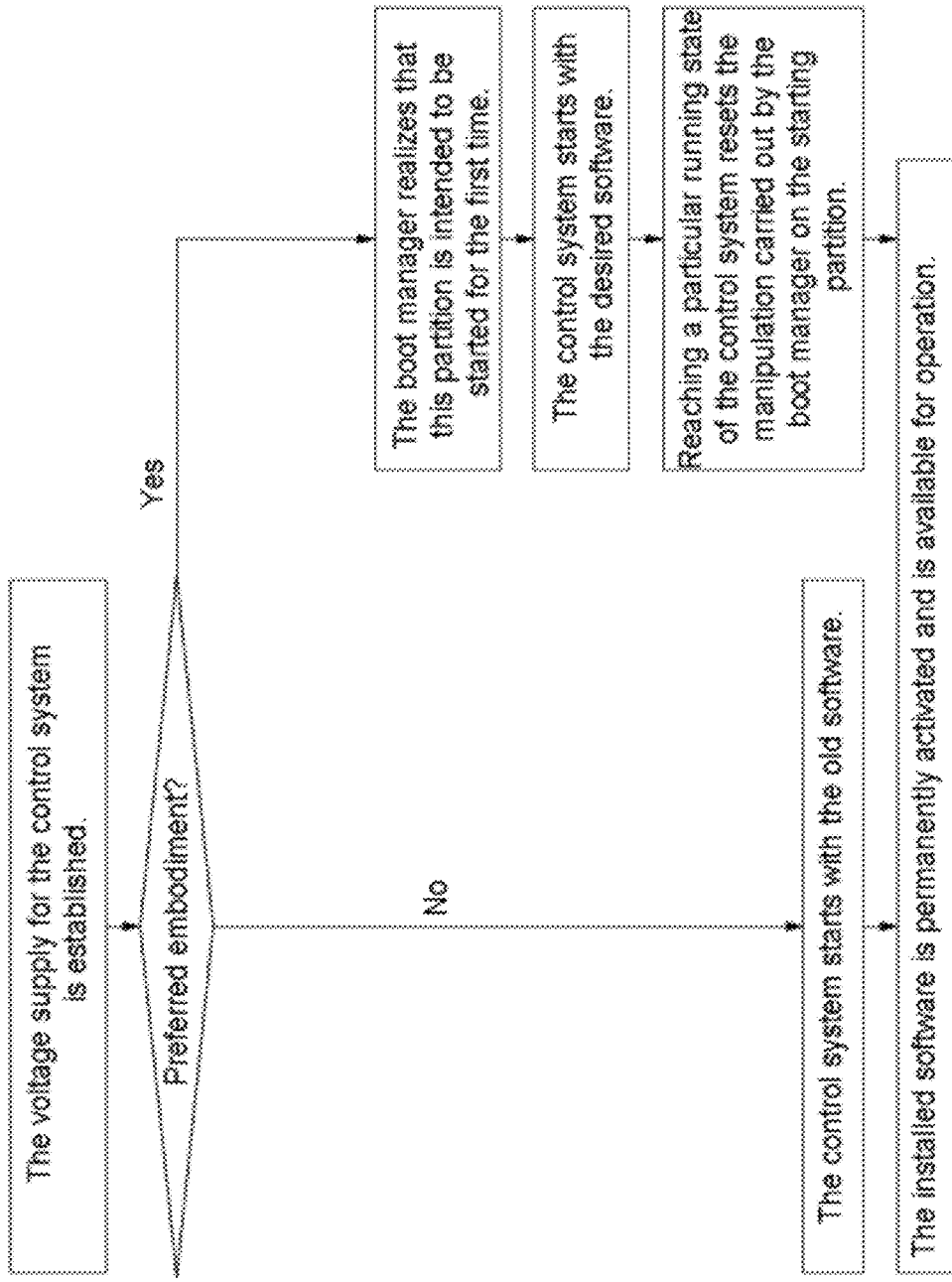
FIG. 3E is a flow chart showing selection of a desired operating system after the machine computer has been restarted.

FIG. 3E shows the operation of restarting the control computer 2. The voltage supply for the control computer 2 is first of all established and a check is carried out in order to determine which operating system software was selected for the next restart during the previous operation of switching off the control computer 2. If the previous operating system software 13 was selected, the control computer 2 starts with this version and controls the printing machine 1 therewith. However, if the new operating system software 18 was selected before switch-off, the boot manager 12 detects this selection and establishes that the operating system software 18 is intended to be started for the first time. In this case, the control computer 2 starts with the new operating system 18 and controls the printing machine 1 with the new operating system 18. However, if a critical running state is reached during restart with the new operating system 18 and the operation of the new operating system 18 is thus not ensured, the boot manager 12 switches back to the old operating system software 13, with the result that the previous reliable operating system software version 13 automatically starts during a restart in the event of a malfunction of the new operating system software 18.

The user data transferred to the new operating system 18 include customer orders, machine settings, system settings and further settings. These data are also stored in the new partition of the new operating system 18, with the result that damage to the data of the new operating system 18 does not affect the data of the old operating system 13. This ensures that the old operating system 13 continues to operate properly if recourse is intended to be had to the old operating system software 13 in the event of a malfunction of the new operating system 18. Each operating system 13, 18 therefore accesses only the data assigned to it. This ensures the highest degree of operational reliability.

The invention claimed is:

1. A method for installing operating system software on a machine computer for controlling a machine, the method comprising the following steps:
   transmitting further operating system software from a remote maintenance computer, over an Internet connection, in addition to old operating system software already running on the machine computer for controlling the machine, while the machine is operating;
   installing the further operating system software on the machine computer while the machine is operating;
   transferring user data from the old operating system software to the further operating system software while the machine is operating; and
   switching off the machine computer and choosing between starting the old operating system software and starting the newly installed further operating system software when switching on the machine again.

2. The method according to claim 1, which further comprises carrying out the installing step by installing the further operating system software on the same storage medium as the already running old operating system software.

3. The method according to claim 1, which further comprises including more than two operating system software versions in a possible selection when switching on the machine again.

4. The method according to claim 1, wherein, before the step of installing the further operating system software, at least one of the machine computer or the remote maintenance computer checks if the further operating system software is suitable for installation on the machine computer.

5. The method according to claim 1, which further comprises signaling the installation of the further operating system software to an operator of the machine, on a display apparatus.

6. The method according to claim 1, wherein the machine computer selects required software modules of the further operating system software on a basis of properties of the machine computer and of the machine and installs the modules in a correct order.

7. The method according to claim 1, wherein the machine computer automatically carries out a restart with the old operating system software in the event of the further operating system software failing to start.

8. The method according to claim 1, which further comprises providing a display apparatus through which desired operating system software can be selected by an operator of the machine, and then installing the selected operating system software with the machine computer.

9. The method according to claim 1, which further comprises at least partially storing the further operating system software on a mobile data storage medium and locally installing the further operating system software on the machine computer through a corresponding interface.

* * * * *